UNITED STATES PATENT OFFICE.

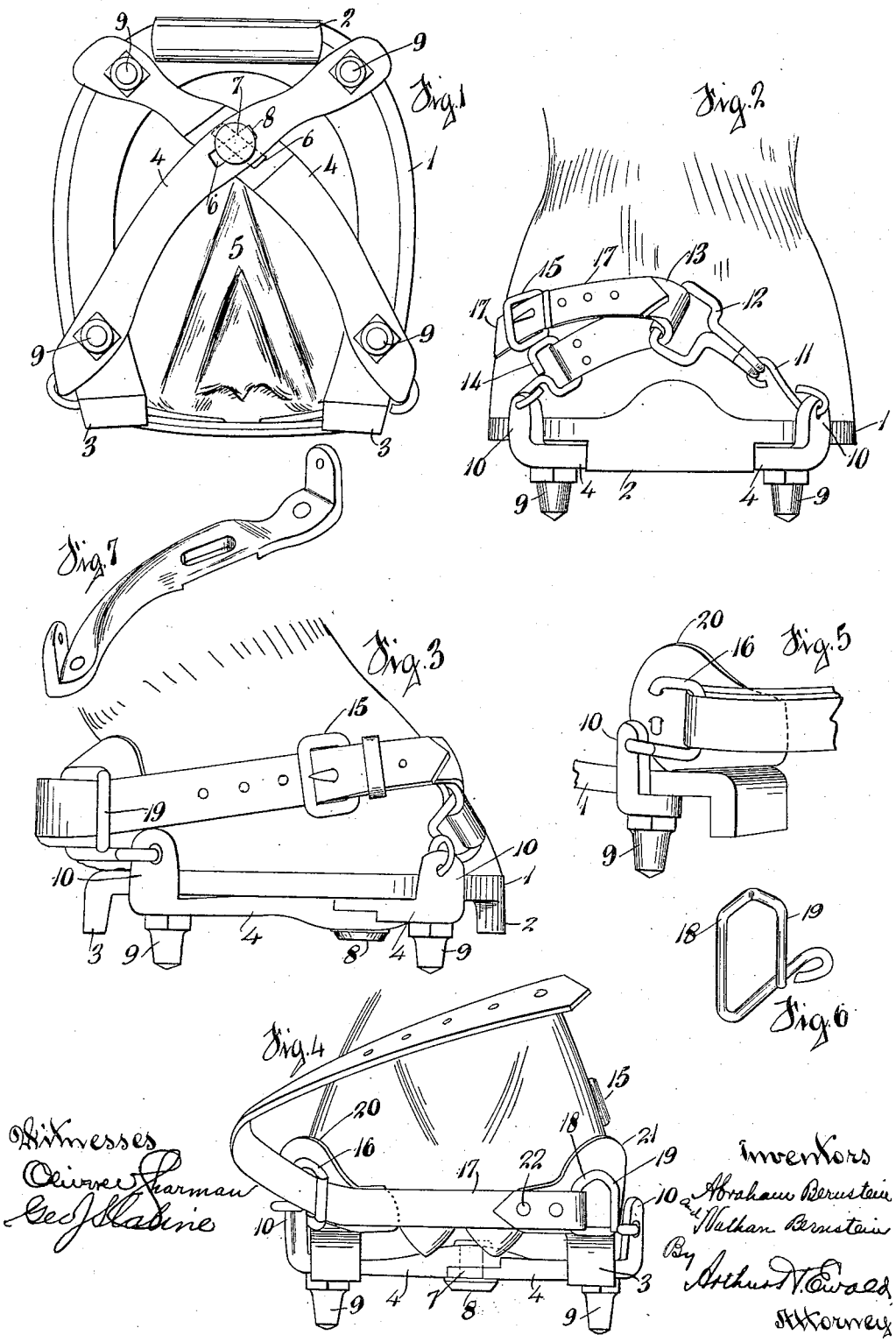

ABRAHAM BERNSTEIN, OF CINCINNATI, AND NATHAN BERNSTEIN, OF LEBANON, OHIO, ASSIGNORS TO THE BERNSTEIN BROTHERS MANUFACTURING COMPANY, OF LEBANON, OHIO, A CORPORATION OF OHIO.

SUPPLEMENTAL HORSESHOE.

1,076,185.  Specification of Letters Patent.  Patented Oct. 21, 1913.

Application filed July 8, 1912. Serial No. 708,135.

*To all whom it may concern:*

Be it known that we, ABRAHAM BERNSTEIN and NATHAN BERNSTEIN, citizens of the United States, and residents, respectively, of Cincinnati, county of Hamilton, and State of Ohio, and of Lebanon, county of Warren, and State of Ohio, have invented a new and useful Improvement in Supplemental Horseshoes, of which the following is a full, clear, and exact description, reference being had to the accompanying drawings, forming a part of this specification.

Our invention relates to a non-slipping device to be attached to the ordinary shoe worn by a horse, and comprises a supplemental shoe in some respects similar to the one shown in the application of Abraham Bernstein, Serial Number 671,197 filed January 15, 1912, but having additional features of advantage over the supplemental shoe shown in said application, whereby the frog and hoof of the horse are better protected, and the attachment is more simple and efficient. Our new supplemental shoe, furthermore, is specifically adapted to prevent snow and ice from packing between the same and the hoof, and to carry the calks in such positions as will render the same most efficient in use, and most comfortable to the animal wearing the same.

In the drawings: Figure 1 is a bottom view of our new supplemental shoe attached for use; Fig. 2 is a front elevation of the same; Fig. 3 is a side elevation; Fig. 4 is a rear elevation; Fig. 5 is a detail; Fig. 6 is a perspective of one of the links; Fig. 7 is a perspective of one of the bars, showing the beveling.

The numeral 1 indicates the ordinary shoe which is attached to the hoof in the usual manner. Said shoe has a toe calk 2 and heel calks 3. Our supplemental shoe consists chiefly of bars 4. These bars are curved, or bowed, as clearly shown in Fig. 1, so as to bring the point of intersection near the front of the hoof, thus leaving the frog 5 of the hoof free from any contact with said bars. At the points of intersection said bars are equipped with slots 6, through which a pin 7 is inserted, loosely, thus allowing the bars pivotal and a slight longitudinal movement. The pin 7 has broad heads 8 by means of which the bars are prevented from coming apart. Each of said bars is beveled on its upper side, as clearly shown in Fig. 7. The ends of each of said bars are equipped with calks 9 of any suitable kind. Each end of each of said bars is also equipped with an upwardly extending arm 10, adapted to abut against the outer side of the shoe when the supplemental shoe is attached thereto. To one of the front arms 10, usually that which fits to the inside of the hoof, is attached, by means of an intermediate link 11, the link 12, which is sufficiently wide to receive the strap 13, which is attached to the other front arm 10 by means of a link 14. The free end of said strap has a buckle 15. To the arm 10 which fits at the rear to the inside of the hoof, is attached a link 16, wide enough to receive the strap 17, attached, by means of link 18, to the other rear arm 10, as shown in Fig. 4. The free end of said strap 17, after being brought through the link 16, is doubled on itself and brought under the arm 19 of the link 18, after which it is brought forward around the outside of the hoof and secured by means of the buckle 15, as shown in Fig. 2. Thus by attaching the straps 13 and 17 as above explained, through the several links, and placing the same under tension by inserting strap 17 in buckle 15 and pulling on said strap, it is obvious that the rear and front ends of the bars 4, will be operated on, causing each pair respectively to be drawn together and the arms 10 to abut firmly against the outside of the shoe 1. The said straps will also draw the supplemental shoe upward against the under side of the shoe 1, by reason of the fact that the hoof becomes narrower from the bottom up, thus causing the straps to slide upwardly as they are tightened. To prevent the strap 17 and the links 16 and 18 from contacting with the hoof and thus producing possible injury, pieces of leather 20 and 21 are employed; the piece 20 being attached to link 16 by means of perforations, as clearly shown in Fig. 5, and the piece 21 being attached to strap 17 by one of the rivets 22 which form the necessary loop by which said strap is attached to link 18.

From the foregoing description the means of attaching, together with the advantages of our new supplemental shoe, will be obvious. By reason of the bowed shape of the bars 4, the said bars are given a long bearing on the under side of the regular shoe, and the calks 9 are so located as to render the footing of the animal wearing the shoe both sure and comfortable, as the said calks are located adjacent the corresponding toe and heel calks of the regular shoe. The beveling of the upper sides of the bars 4 prevents said bars from catching and holding stones, and particularly, snow and ice, which would otherwise lodge between the shoe and hoof and produce discomfort and hoof troubles. The attaching straps are, furthermore, all on the outside of the hoof, thus preventing the same from rubbing against the opposite hoof or leg of the animal, which is a prolific cause of trouble.

Having thus described our invention, what we claim as new and desire to secure by Letters Patent, is:

1. A device of the character specified, comprising two bars adjustably secured together, said bars being adapted to engage a shoe secured to a horse's hoof, a strap attached to the front end of one of said bars, means whereby said strap is adapted to engage the front end of the other of said bars, a second strap attached to the rear end of one of said bars, means whereby said strap is adapted to engage the rear end of the other of said bars, and means for securing together the free ends of said straps whereby said bars may be rigidly secured to said shoe.

2. A device of the character specified, comprising two bars adjustably secured together, said bars being adapted to engage a shoe secured to a horse's hoof, a strap attached to the front end of one of said bars, means whereby said strap is adapted to engage the front end of the other of said bars, a second strap attached to the rear end of one of said bars, means whereby said strap is adapted to engage the rear end of the other of said bars, means for securing together the free ends of said straps whereby said bars may be rigidly secured to said shoe, and means whereby said second strap is prevented from contacting with said hoof.

3. A device of the character specified, comprising cross-bars adjustably secured together, said bars being adapted to engage a shoe secured to a horse's hoof, a strap attached to the rear end of one of said bars, means whereby said strap is adapted to engage the rear end of the other of said bars, and means whereby the free end of said strap may be operatively connected with the front ends of said bars, whereby, upon the tightening of said strap, said bars will be rigidly secured to said shoe.

4. A device of the character specified, comprising two bars adjustably secured together, said bars being adapted to engage a shoe secured to a horse's hoof, a strap attached to the rear end of one of said bars, means whereby said strap is adapted to engage the rear end of the other of said bars, means whereby the free end of said strap may be operatively connected with the front ends of said bars, whereby, upon the tightening of said strap, said bars will be rigidly secured to said shoe, and means whereby said strap is prevented from contacting with said hoof.

In witness whereof, we have hereunto set our hands, this 29 day of June, 1912.

ABRAHAM BERNSTEIN.
NATHAN BERNSTEIN.

Witnesses:
 Geo. E. Young,
 Arthur H. Ewald.

---

Copies of this patent may be obtained for five cents each, by addressing the "Commissioner of Patents, Washington, D. C."